United States Patent [19]

Bernat

[11] 4,185,659
[45] Jan. 29, 1980

[54] SINGLE-HANDLE MIXING FAUCET

[75] Inventor: Georg Bernat, Menden, Fed. Rep. of Germany

[73] Assignee: ITT Industries, Inc., New York, N.Y.

[21] Appl. No.: 861,579

[22] Filed: Dec. 19, 1977

[30] Foreign Application Priority Data

Dec. 22, 1976 [DE] Fed. Rep. of Germany ....... 2658023

[51] Int. Cl.² ............................................. F16K 11/06
[52] U.S. Cl. ............................ 137/625.17; 137/625.4; 137/454.6
[58] Field of Search ............ 137/625.4, 625.17, 636.3, 137/454.6

[56] References Cited

U.S. PATENT DOCUMENTS

| | | | |
|---|---|---|---|
| 3,324,884 | 6/1967 | Dornaus | 137/625.17 |
| 3,384,119 | 5/1968 | Manoogian | 137/625.4 X |
| 3,433,264 | 3/1969 | Parkison | 251/127 X |
| 3,476,149 | 11/1969 | Dornaus | 137/625.4 |
| 3,533,436 | 10/1970 | Parkison | 137/625.4 X |
| 3,543,799 | 12/1970 | Hayman | 137/625.17 X |
| 3,736,959 | 6/1973 | Parkison | 137/454.6 |
| 3,747,638 | 7/1973 | Manoogian | 137/625.4 |
| 3,788,354 | 1/1974 | Symmons | 137/625.4 |
| 3,854,493 | 12/1974 | Farrell | 137/454.6 X |
| 3,920,043 | 11/1975 | Fowell | 137/625.4 X |

Primary Examiner—William R. Cline
Attorney, Agent, or Firm—James B. Raden; Donald J. Lenkszus

[57] ABSTRACT

A single-handle mixing faucet includes a pair of valve plates, one movable and the other fixed, arranged with their contacting surfaces in a direction parallel to the axis of a faucet body. The movable plate is pivotally and movably arranged around a pivot that is movable parallel to the axis of the faucet. The valve elements are contained in a cartridge-like bushing member that facilitates faucet assembly.

4 Claims, 2 Drawing Figures

SINGLE-HANDLE MIXING FAUCET

BACKGROUND OF THE INVENTION

The invention relates to a single-handle mixing faucet of a type wherein two flat and smoothened plates, having through-apertures for cold, hot and mixed water are provided as the valve element, one plate being immovably fixed in the faucet housing and the other being movably arranged in respect of the first plate by means of the handle.

Mixing faucets of this type are generally known as exemplified by German Patent No. 1,550,060 and the following U.S. Pat. Nos. 2,977,986; 3,023,769; 3,035,612 and 3,661,180. With these mixing faucets, the flat plates forming the valve element are approximately circular in shape and are arranged in a cylindrical housing at right angles to the vertical axis of the faucet body; the handle being linked centrally in the movable plate. Since the plates require a relatively large diameter because of the inflow and outflow apertures required and the handle connection, the housing accommodating these valve elements cannot help but be very squat.

In U.S. Pat. No. 2,877,797, the valve elements are arranged in substantial parallel arrangement with the faucet body. However, the control element employed therein to displace the movable valve plate requires relatively substantial machining and assembly.

Furthermore, these prior single-lever mixing faucets require costly assembly techniques.

SUMMARY OF THE INVENTION

In accordance with the invention, the plates of the valve element are arranged with their contacting surfaces in the direction of the axis of the faucet housing and the movable plate is displaceably and pivotally mounted at a point movable in a direction parallel to the axis. A headpiece projecting above the two valve plates is connected to the faucet handle.

Further in accordance with the invention, the entire valve element is arranged in cartridge form for insertion into the faucet body.

DESCRIPTION OF THE DRAWINGS

The invention may be better understood from the following description in conjunction with the drawings in which like reference numerals in the several drawings correspond to like parts and in which.

Figure 1:
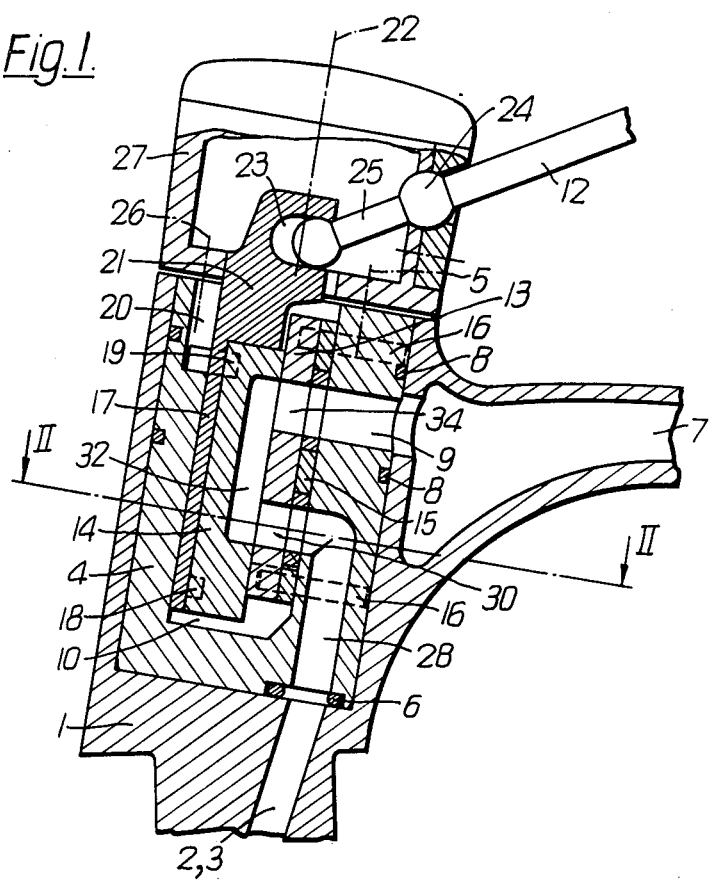
FIG. 1 is a longitudinal cross-section of a single-handle mixing faucet.

DESCRIPTION OF THE PREFERRED EMBODIMENT:

The single-handle mixing faucet illustrated in FIG. 1 includes a faucet body 1 having inflow bores 2 and 3 for hot and cold water and a discharge spout 7. A valve cartridge pressed into the faucet body 1 includes a bushing 4 to which the faucet head casing 27 is secured by bolts 5. Two threaded bores 26 are provided to facilitate insertion and removal of the bushing 4 in the faucet body 1. Two inlet passages 28 and 29 in the bushing 4 are arranged in communication with the inflow bores 2 and 3. The bushing 4 carries a seal ring 6 around the inlet of each of the passageways 28 and 29 to prevent seepage along the bottom surface of the bushing. An outflow bore 9 communicates with the discharge spout 7. A pair of seal rings 8 are carried circumferentially by the bushing 4 on either side of the outflow bore 9 to prevent seepage along the exterior surface of the bushing.

Supported within a chamber 10 having parallel side surfaces 11 are two flat valve plates 13 and 14 which are adjustable in relation to each other by means of a handle 12. The valve plates 13 and 14 are preferably of a highly abrasive resistant ceramic-oxide material.

The valve plate 13 includes inflow apertures 30 and 31 which communicate with inlet passages 28 and 29 respectively. The valve plate 13 further includes an outflow aperture 34 in communication with outflow bore 9. Pins 16 are provided radially in the bushing 4 to immovably secure the plate 13 to the side surface 11. Interposed between the plate 13 and the surface 11 is a sealing disc 15 carrying the ring seals 40. The ring seals 40 are disposed to provide a watertight seal between the inflow and outflow apertures.

The movable valve plate 14 is secured to a fitting 17 by means of pins 18 and 19. The pin 19 extends through the fitting 17 and engages an axial groove 20 in the bushing 4 so that an axially movable fulcrum is thus provided for the plate 14. The plate 14 includes a mixing recess 32.

The fitting 17 includes an integrally formed headpiece 21 projecting above the plates 13 and 14. The headpiece 21 includes a bore 23 perpendicular to the axis 22 of the armature housing. A positioning stud 25 extending from the handle 12 engages the bore 23. The handle 12 is in turn pivotally connected to the head casing 27 by a ball head 24.

The mixer valve shown functions as follows. Hot and cold water flow through the inflow bores 2 and 3 into the inlet passages 28 and 29 and meet the fixed plate 13 at the inflow apertures 30 and 31. The movable plate 14 is provided with a mixing recess 32 in which, depending on the position of the plate, the hot and cold water is mixed. The mixed water thus produced then passes through the outflow aperture 34 into the discharge spout 7.

Figure 2:
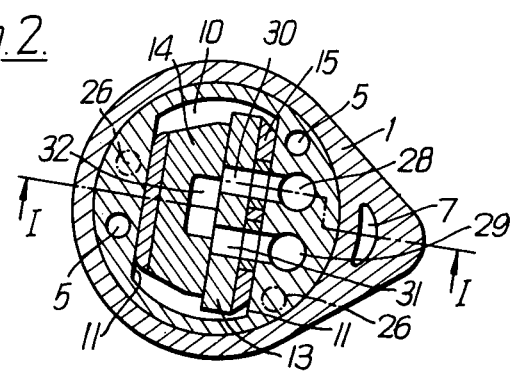
FIG. 2 is a cross-section of the mixing faucet of FIG. 1 along the line II.

The movable plate 14 is shown in FIGS. 1 and 2 in the fully opened outlet position, a central mixing position having been adopted, i.e., the inflow cross-sections of hot and cold water are equally great. By moving the handle 12 up or down, the inflow apertures 30 and 31 are covered to a greater or lesser extent so that a reduction or shut-off or increase in outflow is obtained depending upon the movement. When the handle 12 is subjected to a swivel movement, the positioning stud 25 is subjected to a corresponding swivel movement via the ball head 24 carried in the head casing 27 and thereby causes the plate 14 to pivot about the fulcrum provided by the pin 19 projecting into the axial groove 20. The cross-sections of the inflow apertures 30 and 31 for hot and cold water are then inversely adjusted so that the required change in mixture ratio of the incoming hot and cold water or moderation of the outflowing mixed water is produced.

What is claimed is:

1. A single-handle mixing valve for mixing hot and cold water sources and providing an output thereof, comprising:

a housing having a valve cartridge receiving bore, first and second inlet bores communicating respectively with said hot and cold water sources, and a discharge passage;

handle means; and a cylindrical valve cartridge inserted into said receiving bore, said cartridge having a longitudinal axis and comprising:

a bushing having a valve chamber and first, second and third passages respectively communicating with said first and second inlet bores and said discharge passage;

a first valve plate fixably mounted within said valve chamber and having a first surface parallel to said longitudinal axis, and having first, second and third apertures communicating with said first, second and third passages, respectively;

a valve support plate connected to said handle means and extending into said valve chamber;

a second valve plate carried by said support plate and having a second surface parallel to said longitudinal axis and adapted to slidably engage said first surface, said second surface having a mixing recess; and slidable pivot means for translating a displacement of said handle means in a first direction to a pivotal displacement of said support plate and for translating a displacement of said handle means in a second direction to a corresponding displacement of said valve support plate parallel to said longitudinal axis.

2. A single-handle mixing valve in accordance with claim 1 wherein said slidable pivot means comprises a pin projecting from said valve support plate in a direction perpendicular to said longitudinal axis; and said bushing includes a channel parallel to said longitudinal axis and adapted to receive said pin.

3. A single-handle mixing valve in accordance with claim 1 further comprising:

a seal plate disposed between said first valve plate and said bushing; and a plurality of sealing elements carried by said seal plate to provide seals between said first, second and third passages, respectively.

4. A single-handle mixing valve in accordance with claim 1 wherein said valve cartridge further comprises sealing means for preventing seepage of water along the exterior surface of said bushing.

* * * * *